United States Patent
Hahn-Carlson et al.

(10) Patent No.: US 8,069,054 B2
(45) Date of Patent: *Nov. 29, 2011

(54) AUTOMATED TRANSACTION PROCESSING SYSTEM AND APPROACH

(75) Inventors: Dean W. Hahn-Carlson, St. Paul, MN (US); Richard G. Langer, Lakeville, MN (US); Kevin M. Armstrong, Ham Lake, MN (US); Weiwen Xie, Woodbury, MN (US)

(73) Assignee: Syncada LLC, Minneapolis, MN (US)

( * ) Notice: Subject to any disclaimer, the term of this patent is extended or adjusted under 35 U.S.C. 154(b) by 460 days.

This patent is subject to a terminal disclaimer.

(21) Appl. No.: 12/371,847

(22) Filed: Feb. 16, 2009

(65) Prior Publication Data

US 2009/0150304 A1 Jun. 11, 2009

Related U.S. Application Data

(63) Continuation of application No. 10/436,878, filed on May 12, 2003, now Pat. No. 7,496,519.

(60) Provisional application No. 60/379,561, filed on May 10, 2002.

(51) Int. Cl.
- G06Q 10/00 (2006.01)
- G06Q 30/00 (2006.01)
- G06F 17/00 (2006.01)

(52) U.S. Cl. .......................... 705/1.1; 705/330; 705/400

(58) Field of Classification Search ................... 705/1.1, 705/330, 400

See application file for complete search history.

(56) References Cited

U.S. PATENT DOCUMENTS

| | | | |
|---|---|---|---|
| 4,114,027 A | 9/1978 | Slater et al. |
| 4,270,042 A | 5/1981 | Case |
| 4,305,059 A | 12/1981 | Benton |
| 4,412,287 A | 10/1983 | Braddock, III |
| 4,567,359 A | 1/1986 | Lockwood |
| 4,713,761 A | 12/1987 | Sharpe et al. |
| 4,725,719 A | 2/1988 | Oncken et al. |
| 4,750,119 A | 6/1988 | Cohen et al. |
| 4,926,325 A | 5/1990 | Benton et al. |
| 4,949,272 A | 8/1990 | Vanourek et al. |
| 4,960,981 A | 10/1990 | Benton et al. |
| 5,008,827 A | 4/1991 | Sansone et al. |
| 5,025,372 A | 6/1991 | Burton et al. |
| 5,040,132 A | 8/1991 | Schuricht et al. |
| 5,043,908 A | 8/1991 | Manduley et al. |
| 5,077,694 A | 12/1991 | Sansone et al. |
| 5,117,364 A | 5/1992 | Barns-Slavin et al. |
| 5,153,842 A | 10/1992 | Dlugos, Sr. et al. |

(Continued)

FOREIGN PATENT DOCUMENTS

EP 0 407 026 1/1991

(Continued)

*Primary Examiner* — Fadey Jabr

(74) *Attorney, Agent, or Firm* — Crawford Maunu PLLC

(57) ABSTRACT

Transaction management for contract and contract-related approaches is facilitated. According to an example embodiment of the present invention, a transaction management computer is programmed to automatically set contract terms for a transaction based on business rules previously established between parties to a transaction. In one implementation, the transaction management node automatically derives a contract term including a pricing-related term for a transaction between a buyer and seller using contract information therefor. In one instance, previously-agreed-upon price approaches, such as fixed pricing, seller-controlled pricing, quantity-related tiered pricing and pricing management schemes are stored and used by the transaction management node to automatically derive the prices. With these approaches, pricing disputes that can occur after a transaction has been processed are reduced and/or eliminated.

19 Claims, 8 Drawing Sheets

U.S. PATENT DOCUMENTS

| | | | |
|---|---|---|---|
| 5,161,109 A | 11/1992 | Keating et al. |
| 5,168,444 A | 12/1992 | Cukor et al. |
| 5,175,416 A | 12/1992 | Mansvelt et al. |
| 5,208,446 A | 5/1993 | Martinez |
| 5,218,188 A | 6/1993 | Hanson |
| 5,220,501 A | 6/1993 | Lawlor et al. |
| 5,222,018 A | 6/1993 | Sharpe et al. |
| 5,231,569 A | 7/1993 | Myatt et al. |
| 5,238,349 A | 8/1993 | Grace, Sr. |
| 5,285,383 A | 2/1994 | Lindsey et al. |
| 5,293,310 A | 3/1994 | Carrol et al. |
| 5,329,589 A | 7/1994 | Fraser et al. |
| 5,334,823 A | 8/1994 | Noblett, Jr. et al. |
| 5,334,824 A | 8/1994 | Martinez |
| 5,337,246 A | 8/1994 | Carroll et al. |
| 5,357,563 A | 10/1994 | Hamilton et al. |
| 5,393,963 A | 2/1995 | Thomas et al. |
| 5,426,281 A | 6/1995 | Abecassis |
| 5,440,634 A | 8/1995 | Jones et al. |
| 5,485,369 A | 1/1996 | Nicholls et al. |
| 5,631,821 A | 5/1997 | Muso |
| 5,677,955 A | 10/1997 | Doggett et al. |
| 5,694,551 A | 12/1997 | Doyle et al. |
| 5,717,989 A | 2/1998 | Tozzoli et al. |
| 5,719,771 A | 2/1998 | Buck et al. |
| 5,806,063 A | 9/1998 | Dickens |
| 5,893,080 A | 4/1999 | McGurl et al. |
| 5,910,896 A | 6/1999 | Hahn-Carlson |
| 5,924,082 A | 7/1999 | Silverman et al. |
| 5,924,089 A | 7/1999 | Silverman et al. |
| 5,960,407 A | 9/1999 | Vivona |
| 6,021,202 A | 2/2000 | Anderson et al. |
| 6,055,519 A | 4/2000 | Kennedy et al. |
| 6,131,087 A | 10/2000 | Luke et al. |
| 6,141,653 A | 10/2000 | Conklin et al. |
| 6,151,588 A | 11/2000 | Frederick et al. |
| 6,209,095 B1 | 3/2001 | Anderson et al. |
| 6,223,168 B1 | 4/2001 | McGurl et al. |
| 6,510,383 B1 | 1/2003 | Jones |
| 6,510,384 B2 | 1/2003 | Okano |
| 6,526,443 B1 | 2/2003 | Goldsmith et al. |
| 6,571,149 B1 | 5/2003 | Hahn-Carlson |
| 6,598,026 B1 | 7/2003 | Ojha et al. |
| 6,915,268 B2 | 7/2005 | Riggs et al. |
| 6,937,992 B1 | 8/2005 | Benda et al. |
| 7,047,310 B2 | 5/2006 | Srinivasan |
| 7,206,768 B1 | 4/2007 | deGroeve et al. |
| 7,257,560 B2 | 8/2007 | Jacobs et al. |
| 7,536,354 B1 | 5/2009 | deGroeve et al. |
| 7,536,362 B2 | 5/2009 | Starr et al. |
| 2001/0056395 A1 | 12/2001 | Khan |
| 2002/0040304 A1 | 4/2002 | Shenoy et al. |
| 2002/0046125 A1 | 4/2002 | Speicher et al. |
| 2002/0055850 A1 | 5/2002 | Powell et al. |
| 2002/0072956 A1 | 6/2002 | Willems et al. |
| 2002/0103661 A1 | 8/2002 | Albazz et al. |
| 2002/0107794 A1 | 8/2002 | Furphy et al. |
| 2002/0116348 A1 | 8/2002 | Phillips et al. |
| 2002/0147655 A1 | 10/2002 | Say |
| 2002/0161719 A1 | 10/2002 | Manning et al. |
| 2002/0184527 A1 | 12/2002 | Chun et al. |
| 2003/0014325 A1 | 1/2003 | Biffar et al. |
| 2003/0158811 A1 | 8/2003 | Sanders et al. |
| 2003/0200185 A1 | 10/2003 | Huerta et al. |
| 2004/0049446 A1 | 3/2004 | Seljeseth |
| 2004/0230601 A1 | 11/2004 | Joao et al. |
| 2004/0243690 A1 | 12/2004 | Hancock et al. |
| 2004/0254808 A1 | 12/2004 | Bennett et al. |
| 2005/0027613 A1 | 2/2005 | Takekuma et al. |
| 2005/0033660 A1 | 2/2005 | Solomon |
| 2005/0119980 A1 | 6/2005 | Kohavi et al. |
| 2005/0246192 A1 | 11/2005 | Jauffred et al. |
| 2007/0022021 A1 | 1/2007 | Walker et al. |
| 2007/0208635 A1 | 9/2007 | Van Luchene et al. |

FOREIGN PATENT DOCUMENTS

| | | |
|---|---|---|
| EP | 0 339 850 | 12/1995 |
| EP | 0 779 587 | 6/1997 |
| WO | WO 99/08218 | 2/1999 |
| WO | WO 01/35570 | 5/2001 |
| WO | WO 01/48659 | 7/2001 |

AUTOMATED TRANSACTION PROCESSING SYSTEM AND APPROACH

RELATED PATENT DOCUMENTS

This patent document is a continuation under 35 U.S.C. §120 of U.S. patent application Ser. No. 10/436,878 filed on May 12, 2003 (U.S. Pat. No. 7,496,519), which claims benefit of U.S. Provisional Application Ser. No. 60/379,561 filed on May 10, 2002; both of these patent documents are fully incorporated herein by reference.

FIELD OF THE INVENTION

The present invention is directed to communications and data processing and, more specifically, to communications and data processing involving the establishment and implementation of contracts.

BACKGROUND

Operational management of contractual and transactional interactions between buyers, sellers and others involved in the exchange of products for purposes of commerce have typically been labor and time intensive. Generally, the processes of managing transactions between business entities have been unduly burdensome and inefficient. The various parties involved in a transaction typically change proposed terms and aspects of a proposed transaction on a concurrent and/or iterative basis. Data representing each corporate participant's view of the interaction is stored across one or more enterprise systems managed by that particular corporate participant and not accessible by other corporate participants. Consequently, it can be difficult to know which draft document represents the most current information about the interaction and whether the parties to the transaction have a common understanding. Where the corporate participants have communicated electronically (e.g., via email and Internet-enhanced communications), these document-synchronization difficulties have been compounded by an increased number of co-existing draft documents being viewed by the parties. Commercial transactions then become more difficult as business entities attempt to perform business with each other.

A typical commercial interaction between a seller offering a product and a buyer desiring to acquire that product moves through multiple steps. First, the buyer and the seller negotiate an agreement as to the price the buyer will pay. When this agreement covers an extended period of time it is typically formalized in a contract or catalog. Contracts and catalogs are typically maintained by the seller in a seller-managed computer system that is separate from the computer system or systems which the seller uses to accept orders, fulfill orders and generate invoices. When the invoice system used by the seller to bill the buyer has a different price file than is resident in the seller-managed contract system, pricing exceptions will occur which will increase the cost of the interaction because buyer and seller personnel will have to resolve the differences before the transaction can be completed. The problem can be compounded when the buyer loads the current contract prices into its procurement system for determination of whether the seller is billing correctly during the pre-payment order/invoice reconciliation process. All of seller's invoicing systems could be representing the current contract while one or more of the buyer's systems still represent an expired or not yet active contract. Some or all of the seller's invoicing systems could be representing expired or not yet active contracts while all of the buyer's procurement systems are up to date. The number of combinations of events leading to transaction misunderstandings and disagreements contribute significantly to the overall cost of settling for the exchange of products. As a further complication, the contract contents, the order, the invoice and other documents representing the transaction, and which are required to settle the transaction, often only exist in paper form for access to the individuals attempting to resolve exceptions. Further, the data that does exist electronically is often scattered across numerous applications such as accounts payable, accounts receivable, purchasing, accounting, buyer or seller group, shipping, and receiving. Moreover, where each buyer does business with many sellers and each seller does business with many buyers, tracking such drafts becomes increasingly more difficult.

One type of transaction for which the above difficulties apply is a shipping transaction. Traditional approaches have lead to many challenges to managing transactions between one shipper and one carrier. Typically, however, there are multiple carriers and shippers involved in multiple transactions, which makes the management process more complex, and that much more time-consuming and inefficient. The process is labor intensive in that it relies on physically matching the hard copy of a bill of lading (BOL) for proof of delivery with the hard copy invoice and then trying to apply the terms of a hard copy contract to calculate whether the invoice amount is proper to pay. Exceptions need to be communicated to the trading partner, often involving faxing or mailing paper copies of support materials. Responses to requests for information often result in more paper copies with hand-written annotations that alter the understanding of how the transaction actually transpired. The ensuing series of repetitive and time consuming steps are a source of additional operational expense for both buyer and seller. Also, each BOL is often rated multiple times by multiple parties creating excessive redundancy.

Due to such difficulties and convoluted processes, traditional shipment transaction management systems are highly susceptible to billing errors and fraud. For example, there has been no connection between the delivery of goods and when the shipper is billed for delivery. This may result in double billing, no billing at all, or overbilling the shipper for freight delivery charges. Also, auditing errors may occur, which results in incorrect billing or payment. In addition, the carrier waits a disproportionately long time for payment while the invoice is being audited and/or disputed. For example, traditionally, a delivery takes about five days whereas payment takes about forty-five days. This delay adversely affects the carrier's working capital resources which, in turn, raises the carrier's cost of doing business and raises the prices the carrier must charge to earn the economic return required to remain in business.

Additional costs arise as a result of the existing inefficiencies. Many of the costs are individually small, but very large in the aggregate. For example, the carrier incurs administrative costs including: the cost to create and deliver the initial invoice, costs of resolving billing disputes, costs of providing a signed copy of the BOL to the shipper, and costs of posting accounts receivable. The shipper incurs similar administrative costs to receive the bill, match it with the BOL, manually check the contracts to determine if pricing is correct, generate and deliver payment to the carrier.

Another challenge present in many traditional systems involves the incompatibility of product and service (hereinafter the terms "product" and/or "service" are collectively referred to as "product") reference identifiers between buyers, sellers and other related entities (e.g., a distributor or group purchase organization (GPO)). When multiple reference identifiers are used, tracking and reconciling business transactions become more difficult. The complexity of modern business has also lead to expensive administrative costs associated with commercial transactions. Administrative costs include personnel, software, hardware, and entire departments created for managing commercial transactions to ensure accurate and timely billing and payment. Even with the expensive administrative cost, most transactions have typically relied on paper as the means of communicating within and between corporations. Paper copies are expensive and difficult to track and are not simultaneously accessible from geographical disparate locations. Disputes can also occur with various paper copies circulating within and between corporations (e.g., price discrepancies, short pays, and lengthy price disputes). These disputes can result in burdensome and lengthy negotiations, further frustrating both the buyer and seller. Additionally, the disputes can lead to a deterioration or possibly extinction of the relationship between the buyer and seller. Further costs are incurred if new buyers or sellers need to be found.

Most industries are quite competitive and any cost savings are therefore important. Administrative costs are targeted for reduction as no revenue is directly generated from administrative functions. However, administrative costs associated with commercial transactions have been difficult to reduce in the current business environment with widely diffused data.

The above and other difficulties in the management and coordination of business transactions have presented administrative and cost challenges to business entities on both the buyer and seller ends of transactions, as well as those involved in other aspects of such transactions, including distributors and buying organizations (such as GPOs) who negotiate contracts on behalf of a large, disparate group of buyers.

SUMMARY

The present invention is directed to overcoming the above-mentioned challenges and others related to the types of devices and applications discussed above and in other applications. The present invention is exemplified in a number of implementations and applications, some of which are summarized below.

In a first example embodiment, the present invention is directed to a transaction management system that manages transactions using an approach that is based on business rules previously established by buyer(s) and seller(s). The transaction management system includes a computer and communications node adapted for deriving prices for transactions as a function of pricing rules that are agreed upon by buying and selling entities related to the transaction.

According to another example embodiment of the present invention, a database approach is implemented for communications and/or transaction management regarding contract and price information. Buyer(s) and seller(s) can set pricing, the period in which pricing is to be effective, and other contract-related aspects in advance of any transaction to be performed under that contract, and these aspects can be implemented in connection with further transactions, with modifications to these aspects being implemented manually and/or automatically. In one implementation, the responsibility of reviewing, accepting, and/or disputing new or updated prices is oriented to the buyer of products being contracted for. Sell prices can be set, for example, for particular buyers, purchasing organizations, classes of buyers or all buyers, with a particular price being associated with a transaction as a function of the defined characteristics of the buyer. Prices can also be set as a function of definable terms associated with buyers and/or sellers, with a final price being automatically accepted in response to the definable terms. In another implementation, where prices are disputed, the buyer and seller work together to reach terms acceptable to both parties, using a database approach to record negotiated terms.

With the approaches discussed in the previous paragraph, many of the challenges discussed in the background above (e.g., price discrepancies, short pays, and lengthy price disputes) are minimized or completely eliminated. For instance, a single source of product prices and contracts can be implemented for usage by a variety of buyers and/or sellers, with communications and/or negotiations for a particular transaction being selected based on the buyer(s) and/or seller(s) involved. With all relevant data available to all parties and systems at a central source the synchronization issues in business transactions are eliminated. Buyers and sellers can collaboratively review and approve the contract prior to its use without either party necessarily having to allow the other access to its enterprise systems. Use of the approved data from a central transaction management system ensures that both the buyer and seller are using the most recent agreed upon price. In addition, the centralized transaction management system records the precise time of agreement and the identity of the party executing the agreement.

In another example embodiment, an electronic interface is configured and arranged for interfacing with the transaction management system discussed above. The electronic interface is adapted to execute search functions and access information pertaining to contract terms, such as product prices, contracts, effective dates, and price notes. In one implementation, the electronic interface is adapted for providing user identification data for use by the transaction management system for controlling aspects of the interface, such as authorization, recordation, display and functional capabilities. With this approach, a single source of electronically accessible information can be implemented for finding products that suit user needs in an efficient manner.

The above summary of the present invention is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the detailed description of various embodiments of the invention in connection with the accompanying drawings, in which:

FIGS. 5A-5D show approaches for establishing automated transaction management in connection with a variety of users and according to other example embodiments, wherein:

FIG. 5A shows a manufacturer-based perspective;

FIG. 5B shows a distributor-based perspective;

FIG. 5C shows a retail buyer-based perspective; and

FIG. 5D shows a group purchasing organization-based perspective.

Figure 1:
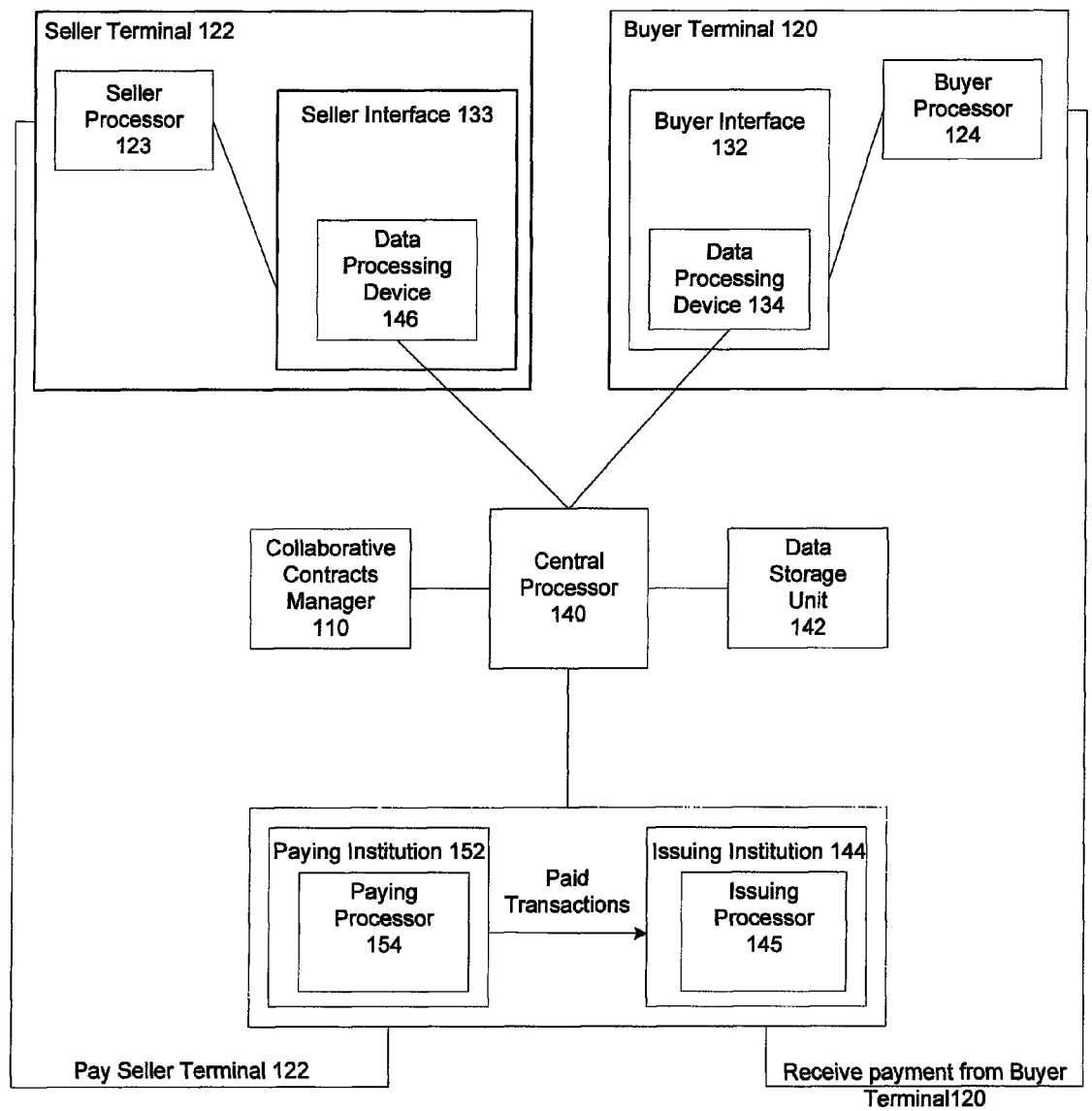
FIG. 1 shows an arrangement and approach for transaction management, according to an example embodiment of the present invention.

While the invention is amenable to various modifications and alternative forms, specifics thereof have been shown by way of example in the drawings and will be described in detail. It should be understood, however, that the intention is not necessarily to limit the invention to the particular embodiments described. On the contrary, the intention is to cover all modifications, equivalents, and alternatives falling within the spirit and scope of the invention as defined by the appended claims.

DETAILED DESCRIPTION

The present invention is believed to be applicable to a variety of different types of communications and financial process management approaches, and has been found to be particularly useful for applications involving the operational implementation and application of pricing to transactions, payments, tracking and related aspects thereof. While the present invention is not necessarily limited to such approaches, various aspects of the invention may be appreciated through a discussion of various examples using these and other contexts.

According to an example embodiment of the present invention, a central transaction management arrangement uses transaction information for buyers and sellers of products to automatically derive pricing and/or payment options for individual transactions. The transaction information may include, for example, the identities of the buyer and seller, the products being purchased, the date of the purchase and the specific contract under the terms of which the transaction is being executed. For instance, specific contracts under the terms of which a transaction is being prosecuted may include prices agreed upon between a buyer and seller for a particular item and/or rules agreed upon for setting certain prices between a buyer and seller. In one instance, prices associated with a particular product are automatically set by the central transaction management arrangement to correspond to transaction information assigned to a particular buyer of the products. The prices may be set, for example, using predetermined prices agreed to by the buyer and seller involved in the transaction. In another implementation, pricing arrangements such as quantity discounts, group discounts and conditional price variances (e.g., an acceptable percentage of variance in cost associated with fluctuating shipping costs, product prices and others) are further automatically implemented in response to the transaction information and the approved contract details in the central transaction management arrangement.

In a more particular implementation, the transaction management arrangement is adapted to use reference contract information regarding pricing from a particular manufacturer, for example, offered to a particular buyer based on that buyer's membership in a group purchasing organization. When a buyer requests a transaction for products covered by the reference contract from a manufacturer-authorized distributor, the transaction management arrangement uses the reference contract information and adds the distributor's markup to derive a final price for the buyer. In another instance, the transaction management arrangement derives the seller's final price by applying the seller's specific discount or surcharge to an industry standard price list (e.g., motor freight tariff). In another instance, the reference contract information is specific to a particular buyer, or to a group purchasing organization (GPO) to which the particular buyer belongs. In this manner, the reference contract and any contract between a buyer and the GPO are nested, with the nested contracts being used to derive a particular term for a transaction for goods. In still another implementation, the transaction management arrangement is adapted to restrict use of the reference contract to selected buyers and, in response to a buyer request, first determine whether the particular buyer making the request is eligible to use the reference contract.

Various example embodiments of the present invention may provide advantage to applications such as discussed in U.S. Pat. No. 5,910,896, referenced above. For example, as discussed in the previous paragraph, variances in shipping costs, managed using one or more approaches not inconsistent with those discussed in U.S. Pat. No. 5,910,896, can be automatically implemented and approved using the stored transaction information. In addition, for general information regarding transactions and for specific information regarding implementations to which various example embodiments of the present invention are directed, reference may be made to the documents attached to the provisional application identified above and to which priority is claimed.

Another example embodiment of the present invention is directed to a database system adapted for automated transaction management that provides a single source of product prices and contracts. In advance of any transaction, prospective buyers and sellers negotiate and/or validate prices and contracts, or simply validate the electronic representation of prices and contracts negotiated through other means. The buyer reviews, accepts and/or disputes updated contract term(s). Once the buyer accepts a contract, a processing center stores the accepted contract and activates the contract for current and/or future business transactions. A collaborative contracts manager applies business rules for actual performance of the contract, with the buyer and seller involved in the transaction defining the applicable business rules. Business rules may, for example, be derived from and/or include buyer and/or seller profile information that includes contract-related data such as product, pricing, shipping, payment terms, currency type, customs information and other typical contract data. Furthermore, the business rules can be stored in a database at the collaborative contracts manager processor. All pricing information and business rules are retrievable by a centralized transaction manager or by applications remote from the collaborative contracts manager such as those located at the buyer or seller location. Potential performance disputes are automatically resolved by the collaborative contracts manager, for instance, by using the predefined and accepted business rules to automatically arrive at performance characteristics prior to executing a transaction. By approaching transactions in this manner, many of the shortcomings of traditional systems (e.g., price discrepancies between different entities of a corporation, short pays, and lengthy price disputes) are minimized or completely eliminated.

The buyer and seller profiles discussed herein may include a variety of information for use in transaction management and otherwise. For instance, a typical such profile includes one or more of the following data: general ledger charts of accounts, identification of computer systems submitting contract or transaction data to the collaborative contracts manager, customer lists, vendor lists, contract and price approval policies, transactional approval policies, business rules, operational roles (e.g., defining what functions a user associated with that role can perform), organizational hierarchy (e.g., defining how much of a company's data universe a user associated with a particular organizational node can access), and users. Seller customer list profiles may also include information further defining the business relationship with the customer from the Seller's perspective, for example, such as a retail buyer relationship, wholesale buyer relationship, etc. Buyer vendor (e.g., seller or distributor) list profiles may also include information further defining the business relationship with the vendor from the Buyer's perspective. Such seller and buyer relational information may, for example, include those discussed further below in connection with FIGS. 5A-5D.

In another example embodiment, a central database and transaction management system uses four types of data to manage transactions. The types of data include security/privilege data, access-control data, entity profile data, and business rules data. Security/privilege and access control data types provide the appropriate levels of protection (e.g., log-in and password data) to the data stored and processed by the system and also provide access to such information at various levels/hierarchies within each company. For example, once a company is enrolled or registered to use the system, initial implementation includes definition of operational filters that define how a user (within an organization level or otherwise) can access the transaction information and/or interact with the system. Such operational filters can include, for example, filters that limit the extent to which a user (e.g., employee or agent of the company) can: approve/hold/deny/cancel/update transactional steps, view transaction-related data, and analyze the data.

The entity profile data type permits the system to track the enrolled companies, their vendor identifier numbers, the associated accounts and contracts, and provides for mapping between organizational levels within enrolled companies and between enrolled companies; where this mapping includes tracking of the various entities as well as the products at issue for processing transactions. Using the entity profile data type, the business rules data type are defined by the enrolled companies for their anticipated transactions to permit the system to process transactions with specified sets of characteristics, for example, to support self-invoicing, and to implement EIPP (electronic invoicing presentment and payment) with or without (product-ID) matching. With the above data in place, the system permits the respectively enrolled organizations to continue conducting business using descriptors meaningful to their organizations, while interpreting and processing these descriptors at the system according to the entity profile data and the business rules data.

Once established, a variety of transactions and transaction management activities can be implemented using these data types. In one example, the above data types are used to derive a specific term by which a transaction is managed (e.g., to derive a price to assign to a particular transaction, to derive a particular mark-up to add to a base price or to identify a particular product requested by a user-specific identification number).

In another example, the data is used to execute a variety of financial data-processing modules within the central database and transaction management system. Six kinds of financial data-processing modules are exemplified and shown and discussed in an attachment hereto which is identified as Appendix A (including seventeen pages).

In one particular implementation, profile information such as business rules, operational roles, authorization levels and/or other attributes are specific to particular levels and/or individuals within a particular entity. This profile information is stored in the central database and transaction management system discussed above and used for implementing transactions. For example, when a particular company includes different subsidiaries, divisions or locations, profile information can be tailored for the particular source. Certain profile information can also be implemented to supersede other profile information, for example, when a particular subsidiary is assigned different specific pricing terms, relevant to another subsidiary of a common company.

In another example embodiment of the present invention, an electronic interface is configured and arranged for providing user access to a collaborative contracts manager such as discussed above. Purchases of goods can be made using the electronic interface to communicate with the collaborative contracts manager and pricing rules engaged thereby. The electronic interface also facilitates user-executed search functions for accessing information such as product information, product prices, contracts and price notes. Access to information via the collaborative contracts manager by the user interface is adaptively controllable, for instance, using authorization approaches including user identification, interface identification, password access and others. With this approach, a single source of electronically accessible information is made available for pricing, contracting and related matters to a multiplicity of parties, which allows users associated with those parties to efficiently find a product or products that suit their needs.

In another example embodiment, a transaction management system stores information for buyers and sellers and communicates therewith using an identification approach for users at the buyer and/or seller level. The system controls access to the stored information as a function of user identification (ID), with access parameters controlled for processes such as contract modification, price modification, display configuration, access to the stored information for that particular user and others. Using seller offerings that make up at least part of the stored information for a particular seller, as well as buyer access controls, the seller offerings are automatically configured for usage by the individual users. The automatic configuration may, for example, include price, delivery and payment options. In response to the seller offerings and other stored information, the transaction management system is adapted for accepting purchase requests from buyers and communicating the purchase requests to the seller from which the purchase is to be made. The transaction management system is further adapted for accepting acknowledgment of receipt by the buyer either manually (e.g., an individual buyer logs into the system with a user ID and confirms receipt) or electronically (e.g., buyer's inventory receiving systems automatically generate and transmit a detailed notice of receipt). Once receipt is acknowledged, the system communicates that acknowledgment to the seller. In one implementation, the system is further adapted for automatically paying the seller in response to the receipt acknowledgment. In another implementation, the system is further adapted to invoice the buyer for the purchase.

In another implementation, the transaction management system discussed in the preceding paragraph is further adapted for accepting a receipt of purchase acknowledgment including receipt characteristics. For example, characteristics such as total acceptance of goods, partial acceptance of goods and rejection of goods at the invoice or receipt line item level can be included in the acknowledgment. This information can be required as being verified for ensuring compliance before payment for a transaction is executed. An invoice for a particular transaction can be updated with this and other transaction-fulfillment-related information. Using this approach, problems with received purchases, such as damaged goods, improper goods, etc., can be readily addressed. The various invoicing and payment-related characteristics are correspondingly modified (e.g., payment is only made for accepted portions of goods, or credit for the cost of returning goods is granted).

Transaction billing and payment is managed using an approach including third-party control, according to another example embodiment of the present invention. Buyer and seller entities involved in a transaction use a third party to coordinate purchases and payment thereof. The seller communicates offerings (e.g., goods with price and shipment characteristics) to the third party, and buyers access the offerings via the third party. When a request for purchase of the seller offerings by a buyer is made to the third party, the third party submits the request to the seller and pays the seller for the purchase. In one implementation, the payment is not effected until the buyer has acknowledged receipt. The third party then charges one or both of the seller and buyer a fee for handling the purchase, and correspondingly bills the buyer for the purchase.

In a more particular example embodiment, buyers and sellers approve contracts using a collaborative contract manager and submit order and invoice quantities for executing the contracts to a central processor arrangement (e.g., including the collaborative contract manager). The central processor arrangement then uses the prices from the collaborative contracts manager to establish the amount of the settlement (i.e., price) between the buyer and the seller. In one instance, the seller uses the collaborative contracts manager as the central repository called by various seller fulfillment systems. In another instance, the buyer uses the collaborative contracts manager as the central repository called by various buyer procurement systems.

In still another example embodiment of the present invention, a collaborative contracts manager is adapted to assign a pricing term to transactions using a product identification (ID) matching approach and business rules. The product ID matching approach involves matching a product ID to business rules and, therefrom, deriving a pricing term for purchase of the product to which the ID relates. For example, when buyers and sellers, or even different buyers within a single organization, use different product IDs for the same goods, the collaborative contracts manager matches the buyer's product ID to a seller product ID and, therefrom, uses business rules to derive a price for the particular product to which the product IDs refer. In a more particular implementation, the product ID includes embedded information relating to the product and other characteristics of the transaction, such as the origin of the product, the destination of the product and a mode of shipping for the product. In another implementation, the product ID includes information relating to a line item of a particular contract where a product is listed.

FIG. 1 is a communication system 100 including a collaborative contracts manager 110 for handling business transactions between a seller and a buyer, according to another example embodiment of the present invention. The communications system 100 includes a seller terminal 122 and a buyer terminal 120. The seller terminal 122 includes a seller processor 123 adapted to generate a seller profile, one or more authorized buyer profiles and contract data and to communicate the profiles and contract data to a seller interface 133. The seller interface 133 includes a data processing device 146 adapted to establish rules for a business transaction by submitting a seller profile, one or more authorized buyer profiles and contract data (i.e., received from the seller processor 123) to a central processor 140. The seller interface 144 is further adapted for displaying contract data received from the central processor 140, and communicating to the seller from the central processor 140 the acceptance or dispute of contract data by a buyer. The central processor 140 electronically organizes a seller's contract data using a seller's profile, with the contract data and profile being stored in a data storage unit 142. Ownership and access to the seller's contract data stored in the data storage unit 142 is controlled by the seller, for example, using criterion such as user authorization or password protection.

The buyer terminal 120 includes a buyer processor 124 adapted for generating a buyer profile and communicating the generated profile to a data processing device 134 at a buyer interface 132. The buyer interface 132 is adapted for displaying contract data received from the central processor 140 and the data processing device 134 communicates the acceptance or dispute of contract data as input at the buyer interface 132 to the central processor. The central processor 140 is coupled to a collaborative contracts manager 110 that provides an interface for buyer and seller transaction management including pricing management. The central processor 140 processes and stores pertinent business transaction information in the data storage unit 142, with access thereto being restricted to authorized users (i.e., authorized buyers and sellers via buyer and seller terminals). Using the buyer and seller profiles, the collaborative contracts manager 110 automatically sets prices for transactions between the buyer and seller.

In a more particular implementation, the central processor 140 interfaces with a payment system 141 including an issuing institution 144 and a paying institution 152. An issuing processor 145 of the issuing institution 144 maintains a credit account for the buyer terminal 120 and debits a particular buyer terminal's account for transactions managed with the communications system 100, such as the shipment cost of a product, the product cost and others. In response to transactions managed at the central processor 140, a paying processor 154 of the paying institution 152 tenders payment to the seller terminal 122, for example, when the receipt of goods is acknowledged by a buyer or at the time a buyer makes a purchase.

Figure 2:
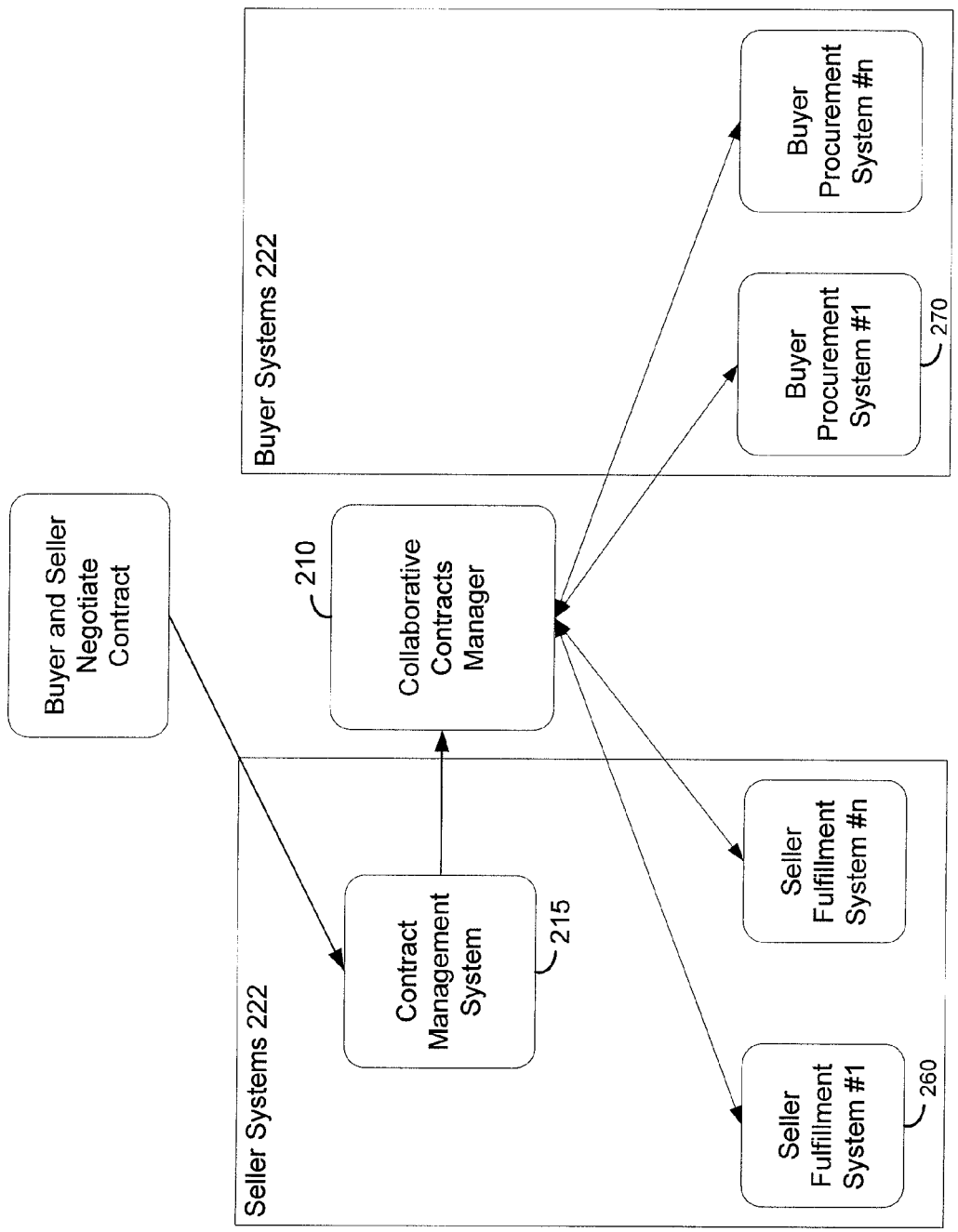
FIG. 2 shows another arrangement and approach for transaction management, according to another example embodiment of the present invention.

FIG. 2 illustrates one approach for implementing a collaborative contracts manager (CCM) 210, which provides an interface for a buyer system 220 and a seller system 222 for transaction management, according to another example embodiment of the present invention. The CCM 210 addresses synchronization issues between the buyer system 220 and the seller system 222, such as those discussed above, by implementing pricing rules that have previously been agreed upon such that disputes over transaction price are typically eliminated. These pricing rules may include, for example, criterion defining pricing data that can be automatically approved (e.g., offerings within a selected buyer variance), and also control pricing information made available to different users of the CCM 210. The pricing rules may also include, for example, prices associated with a particular quantity of products, with different per-product prices being assigned for particular quantities of products (e.g., such as with a volume discount). In addition, the CCM 210 may be located geographically remote from both of the buyer and seller systems 220 and 222, such that buyer access to the CCM does not require access to either the buyer's own systems or seller systems and seller access to the CCM does not require access to either the seller's own systems or buyer systems. This structure eliminates security concerns for both parties relative to either party granting the other party access to the first party's systems.

A contract management system 215 of the seller system 222 loads contract data into the CCM 210. A seller fulfillment system 260 manages customer orders and inventory, fulfills orders, and provides invoices for the goods provided. The seller fulfillment system 260 communicates with the CCM 210 for access to contract and other data (e.g., using a network computer link). In one implementation, the CCM 210 tracks order fulfillment for showing the percentage of an order quantity that has been fulfilled.

A buyer procurement system 270 is programmed for reviewing contract data, generating orders, and auditing invoice price to order price. The buyer procurement system 270 also communicates with the CCM 210 for access to contract and other data, such as product catalogue data maintained by the seller system 222. The CCM 210 maintains the most current contract data, which has been found useful in reducing or even eliminating any misunderstanding of contract data by either or both the buyer system 220 and seller system 222.

In a more particular implementation, the CCM 210 is further adapted to search for contracts for a particular item offered by different sellers and to identify prices for purchase of the item by a particular buyer. For instance, when a buyer requests a particular product at the best price from the CCM 210, a search is performed using the buyer's information and seller information to identify eligible contracts (e.g., the seller and buyer meet each other's criteria for establishing a contract). Once eligible contracts are identified and pricing for execution of the contracts for the particular item (and other transaction information, such as quantity and delivery options) have been determined, a contract with the lowest price is selected and implemented. With this approach, a buyer can automatically have a lowest-price eligible contract identified and implemented for purchasing products.

The buyer and seller systems 220 and 222 may, for example, communicate with the CCM 210 and/or each other using a communications link, such as the Internet. Each of the buyer and seller systems and the CCM 210 include a communications port for facilitating these communications. For instance, when the communications are over the Internet, the communications port includes an Internet-protocol interface, for communications over links such as a telephone line, DSL line, cable line or wireless link.

In another implementation, the CCM 210 is configured to return one of three conditions: 1) no contract is found naming a requested buyer, seller and product combination, 2) no contract is found with a currently valid price for the requested buyer, seller and product combination and 3) a contract is found with a currently valid price for the requested buyer, seller, product combination and requested quantity. With situations 1 and 2, the CCM 210 generates a transaction audit exception (e.g., through processes discussed below in connection with FIGS. 3A and 3B). Either the buyer or seller can access the CCM 210 to resolve the exception in situations 1 and 2, after which the CCM can be accessed to execute the contract consistent with situation 3.

The approaches shown in the remaining figures may, for example, be implemented in connection with the collaborative contracts managers and other arrangements shown in FIGS. 1 and 2 and discussed above in connection therewith. In this regard, reference is made to portions of the figures discussed above by way of example in the following discussion.

Figure 3A:
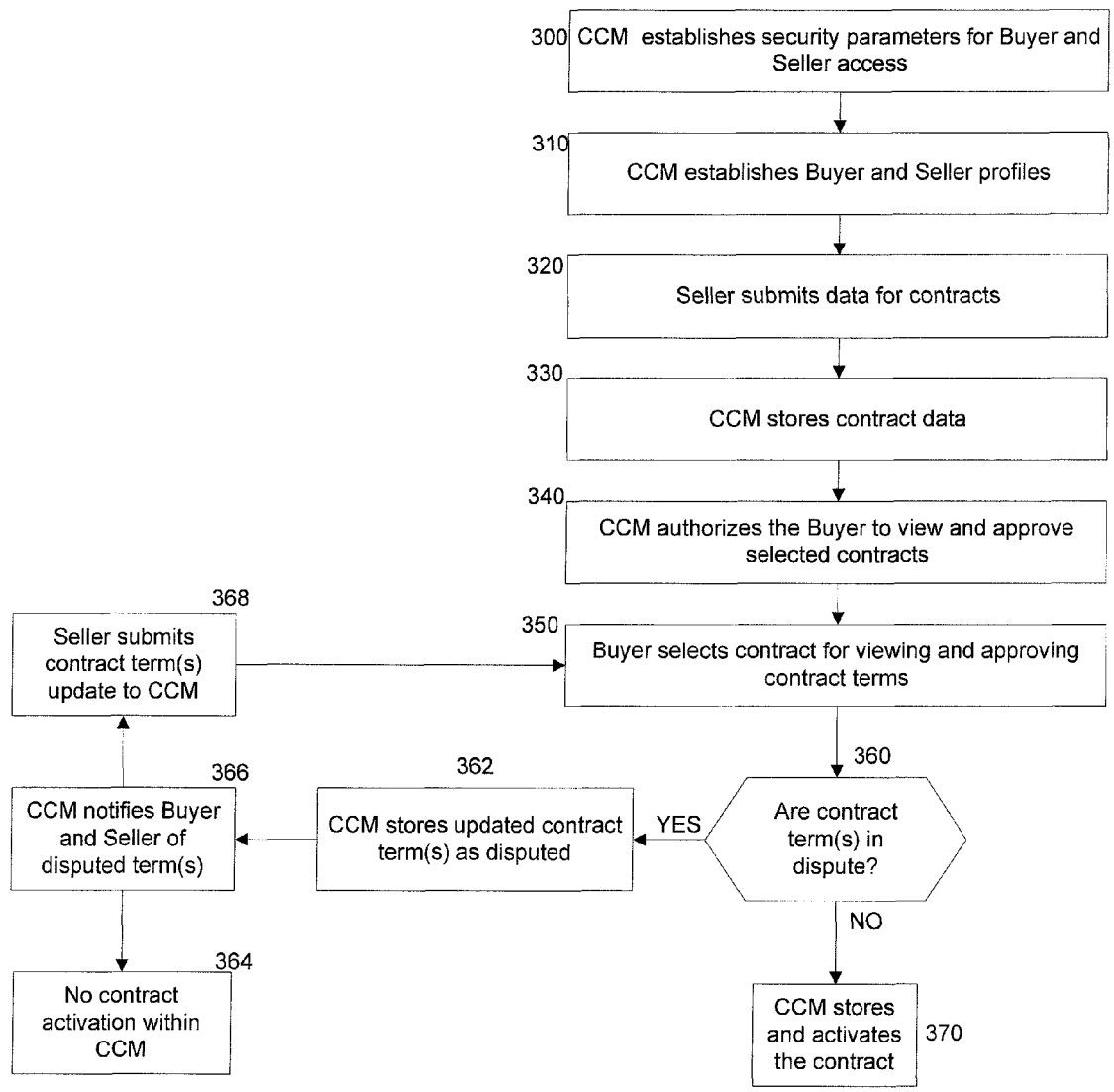
FIG. 3A shows an automated transaction approach involving a collaborative contracts manager, according to another example embodiment of the present invention.

FIG. 3A is a flowchart illustrating an example approach for automated transaction management with a collaborative contracts manager, according to another example embodiment of the present invention. At block 300, security parameters managing the access of buyer and seller terminals (with corporate and/or individual users) to shared contract data are managed using security infrastructure in the collaborative contracts manager. In this instance, the collaborative contracts manager (CCM) may, for example, include the CCM 110 of FIG. 1 or a combination of the CCM 110 and the central processor 140. A unique user ID and password is issued to each individual user (i.e., an individual person) authorized by a buyer entity (i.e., an individual business, a business division, or a buying group) for accessing the CCM. Similarly, a unique user ID and password is issued to each individual user authorized by a seller entity (i.e., an individual business, a business division or a distributor) for accessing the CCM.

At block 310, the buyers and sellers submit profiles to the CCM using buyer and seller terminals (e.g., buyer and seller terminals 120 and 122 of FIG. 1, respectively). The CCM is programmed for establishing different profiles for a variety of users, such as buyers, sellers, contract owners, and contract participants. At block 320, the seller terminal submits contract data that can be formalized by a legal document or simply represent a unique set of prices for a specific customer (e.g., buyer or buyer group) or set of customers. The seller terminal may, for example, be adapted for defining whether it is only a particular named participant (e.g., buyer organizational element) that can access the contract, or the named participant and any organizational element reporting into that named participant. Non-contract data and quoted sell prices by customer and product can also be submitted. A seller terminal can be used to submit public or private contracts, with public contracts being available to a buyer organization, for example, self-identified as meeting the target criteria, and private contracts being selectively available to seller-defined buyer groups, for example, that meet the target audience criteria. In one implementation, the buyer/seller must belong to a purchasing organization that is eligible for a particular contract in order to execute transactions using the contract terms (e.g., to take advantage of pricing arrangements for members of the purchasing organization).

At block 330, upon receipt of contract information, the collaborative contracts manager 110 stores contract data in its database. After a contract or contracts have been recorded, the CCM invokes the buyer's business rules to determine if the contract is to be automatically accepted. If this is the case, the CCM records the contract as approved for use in pricing. If the buyer's business rules require manual pricing, the CCM communicates the existence of contracts needing review to the buyer and authorizes the buyer terminal (e.g., upon submission of an acceptable user ID, password, etc., by a user at the buyer terminal) to view and approve selected contracts according to the buyer's profile at block 340. Once approved, future transactions that are governed by the contract are automatically priced using the CCM.

As discussed above, in order for a buyer to execute transactions using a particular contract requiring authorization, the buyer must be authorized to do so (e.g., belong to a purchasing organization that is eligible for the contract or have negotiated the contract directly). Furthermore, the particular user at the buyer terminal must have the operational right as defined within operational roles to approve contracts, for example, using an authorization level set by a buyer organization.

Inputs received through the buyer terminal are used to select a contract for viewing and approving contract terms at block 350. In one instance, the buyer terminal and the CCM are adapted for implementing a find, or search, function for communicating available contracts to a user at the buyer terminal. For instance, a user at the buyer terminal can launch a find function to generate a list of contracts through a user interface at the buyer terminal. The CCM communicates with the buyer terminal for communicating (e.g., displaying) a list of one or more contracts that satisfy search criteria input at the buyer terminal. A user at the buyer terminal can then select a contract for viewing from the results of the search.

Users at the buyer terminal can accept or dispute contract term(s) for a selected contract at block 360. In one implementation, sellers can update contracts or establish new contracts with prospective buyers being responsible for reviewing and accepting or disputing new or updated contract terms (e.g., sell prices). In some implementations, buyers are automatically notified of new or updated contract terms (e.g., by signing up for a notification email). If contract term(s) are not in dispute at block 360, then the contract term(s) are accepted, the identity of the approver and the date/time of approval are captured and stored with the contract and the contract is activated for use at block 370. The buyer and seller may then apply these prices to individual invoices and orders processed after the contract has been accepted. If contract term(s) are disputed, the CCM stores contract term(s) as disputed at block 362 as well as the date/time the dispute was notified and the identity of the party initiating the dispute. In addition, the buyer user can enter notes in the CCM indicating the buyer user's rationale for disputing the contract term. These notes become an indelible part of the contract terms stored in the CCM. The CCM identifies the disputed contract term(s) to the particular buyer and seller involved in the dispute at block 366 and flags the disputed contract term(s) for review.

In the event a seller decides to respond to the dispute, the seller submits a response at block 368. Such a response may, for example, include sending a contract term update to the CCM, entering notes in the CCM indicating where the buyer's reasoning is flawed, said notes becoming an indelible part of the contract terms stored in the CCM, or by making changes through the CCM. A variety of contract terms can be updated, such as contract eligibility, product availability, product price, price effective dates and tier eligibility. In the event the seller chooses not to acquiesce to buyer disputes and the buyer does not approve the contract after the dispute is stored at block 362 and the buyer and seller are notified at block 366, contract activation does not occur, as shown at block 364. Access to the CCM for inputting seller responses to disputed terms is controlled with a user authorization approach, such as discussed above. A user at the buyer terminal may then select an updated contract for viewing and approving contract terms at block 350, with the process resuming from there.

Figure 3B:
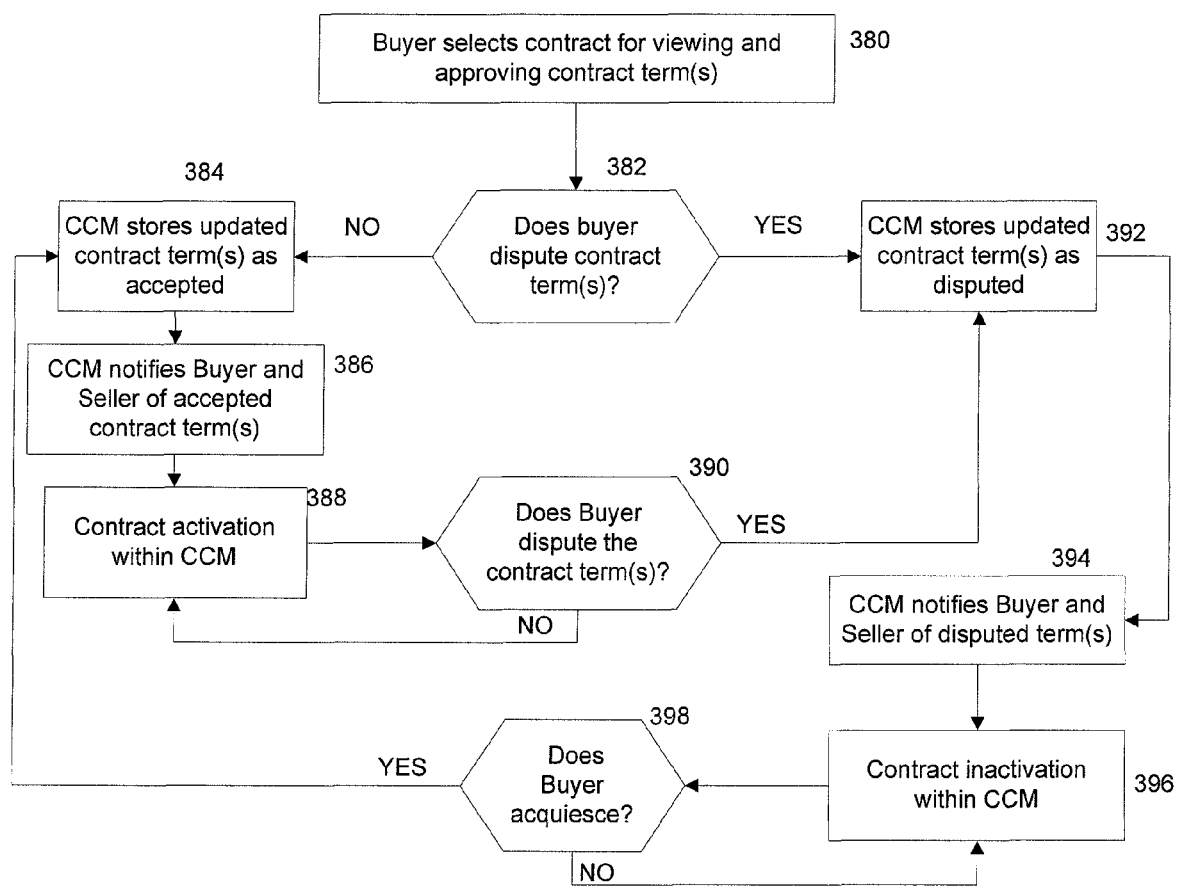
FIG. 3B shows another automated transaction approach involving a collaborative contracts manager, according to another example embodiment of the present invention.

FIG. 3B is a flowchart illustrating an example automated transaction management approach utilizing a collaborative contracts manager (CCM), according to another example embodiment of the present invention. FIG. 3B may be implemented, for example, in connection with buyer review and approval of new contracts and subsequent review and approval of existing contracts and/or proposed contract terms that a buyer initially disputes but later accepts.

FIG. 3B begins at block 380 with a user at a buyer terminal selecting a contract for viewing and approving contract term(s). At block 382, the user enters inputs at the buyer terminal for accepting or disputing contract term(s) for the selected contract. If contract term(s) are accepted at the buyer terminal, the updated contract terms are stored as accepted at block 384, the CCM notifies the buyer and seller of the accepted terms at block 386. A contract is then activated within the CCM at block 388, where it is used to set transaction terms such as pricing for transactions between the buyer and seller. The contract remains activated unless the buyer and/or seller decide to change and/or dispute terms (and, in the condition that certain terms can be changed within limits without changing the accepted status of the contract, the contract remains activated if these changes are effected within the limits).

If contract term(s) are disputed at the buyer terminal (e.g., a buyer inputs disputed and/or alternate terms at block 382), the CCM stores the updated contract term(s) as disputed at block 392. The buyer and seller are both notified of the disputed terms at block 394. The disputed contract term(s) are stored as an inactivated contract within the CCM at block 396, where it remains inactivated unless the buyer decides to accept the previously disputed terms at block 398 (i.e., requests a change in the contract at a later date). If the buyer accepts the previously disputed contract term(s) at block 398, the CCM stores the updated contract term(s) as accepted at block 384, where the process continues as discussed above. If the buyer does not accept the previously disputed contract term(s) at block 398, the contract term(s) remain as inactivated at block 396. The CCM then can process the disputed contract term(s) in one or more of a variety of approaches. For example, by deleting the information regarding disputed terms or maintaining the disputed terms for a pre-selected time during which the buyer may acquiesce.

Figure 4A:
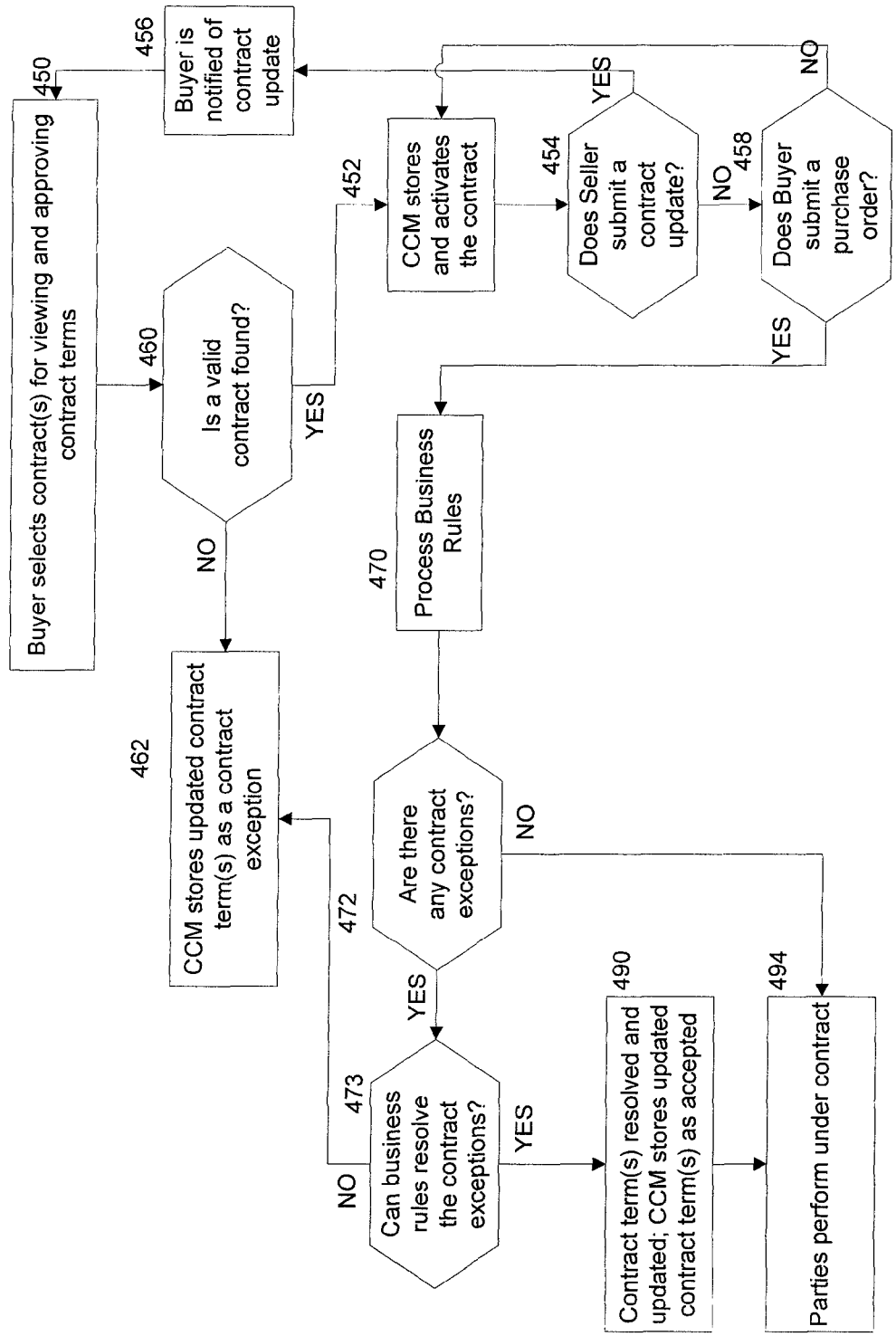
FIG. 4A shows an approach to automated contract performance using a collaborative contracts manager, according to another example embodiment of the present invention.

FIG. 4A is a flowchart illustrating an example approach for automated contract performance after a contract has been formed utilizing a collaborative contracts manager (CCM), according to another example embodiment of the present invention. FIG. 4A begins at block 452 with a CCM storing and activating contract terms previously agreed upon by a buyer and a seller (e.g., using buyer and seller terminals as discussed above). If the seller submits a contract update at block 454, the buyer is notified of the contract update at block 456. The buyer reviews the updated contract at block 450 and, if an acceptable and valid contract is found at block 460, the updated contract is stored and activated at block 452. For instance, a valid contract including a currently valid price for the particular buyer, seller, product combination and requested quantity is found at block 460, the contract is stored and activated at block 452. If a valid contract is not found at block 460 (e.g., no contract is found naming the requested buyer, seller and product combination, or with a currently valid price for the requested buyer, seller and product combination), the CCM stores the updated contract terms as having a contract exception. If the seller does not submit a contract update at block 454, the current (accepted and activated) contract is used for buyer purchases.

Once the contract is stored and activated at block 452, and in the absence of any contract update by the seller at block 454, the stored contract is ready for use. At block 458, a buyer submits a request for performance of the stored contract, for example, using a purchase order. At block 470, the CCM examines buyer and seller business rules for performance details of the purchase in connection with the request for performance. The business rules may, for example, include buyer and seller profile information, such as information relating to acceptable variances in contract terms that can automatically be approved. For general information regarding transactions and for specific information regarding profile approaches that may be implemented in connection with these and other example embodiments, reference may be made to the above-discussed patent entitled "Shipment Transaction System and an Arrangement Thereof" to Hahn-Carlson. For instance, pricing, shipping and other contract terms can be verified and/or modified using these approaches. In one implementation, the business rules are processed at block 470 using a business rules processor that is either part of or separate from the CCM. If the request for performance falls within prescribed terms of the stored contract, there is no contract exception(s) (e.g., an expired contract or a performance dispute such as a different price or shorter performance date) at block 472 and the buyer and seller perform under the contract at block 494.

If there is a contract exception at block 472 and the business rules can resolve the contract exception at block 473, the contract terms are resolved and updated at block 490. For example, if the seller's and/or buyer's business rules tolerate flexibility in the performance, these tolerances are used to automatically adjust the terms of the contract for the particular performance requested at block 458. The buyer and seller then perform under the contract using the contract terms updated in response to the performance dispute. If the business rules cannot resolve the exception at block 473 (e.g., if the buyer requests a lesser price than the seller will provide and the buyer's business rules do not allow for flexibility in the price), the contract term(s) are stored as having an exception at block 462.

Figure 4B:
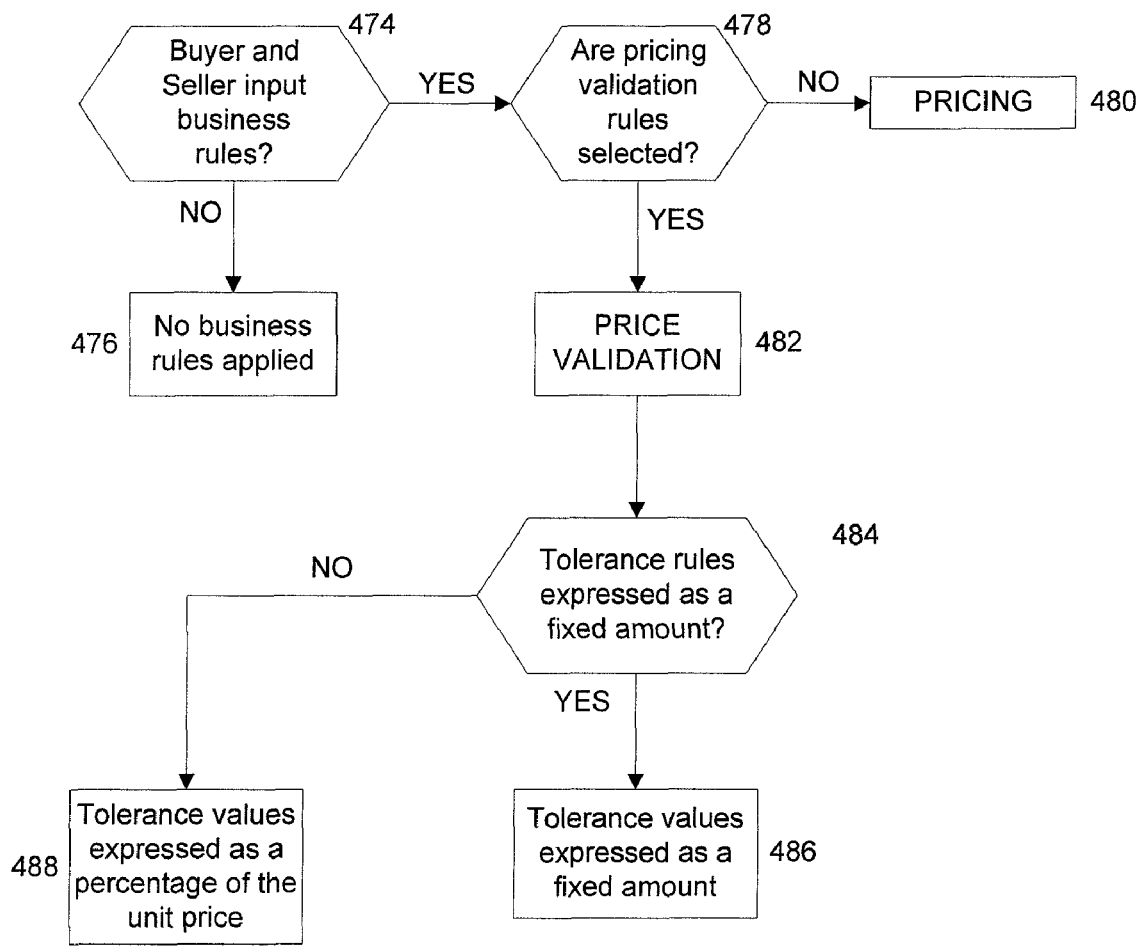
FIG. 4B shows an approach for automated pricing business rule application, in connection with another example embodiment of the present invention.

FIG. 4B is a flowchart illustrating an approach for programming a collaborative contracts manager (CCM), according to another example embodiment of the present invention. Once programmed, the CCM is adapted for managing transactions, such as by deriving or otherwise providing pricing therefor. Buyer and Seller profiles are used to define business rules for the CCM. For one implementation of the CCM at block 474, the buyer and/or seller may input business rules for automated contract performance (e.g., using buyer and seller terminals as discussed above). Price business rules, for example, may be selected by the buyer and seller as none (no rules), pricing (fixed or tiered price), or pricing validation (validation per rules). If no price business rules are input at block 474, then no price business rules are applied at block 476 and the CCM is not used for establishing pricing for contract performance. These pricing business rules are implemented when a contract has been stored and activated within the CCM.

In some implementations, a variety of other business rules are also implemented in connection with the example embodiments discussed in connection with FIG. 4B. In one instance, the total purchases from a particular buyer or group of buyers during the term of the contract may be limited to not exceed a selected amount; once the selected amount has been reached, purchases under the contract are not allowed. In another instance, the total purchase of items on a given line item within a contract is limited not to exceed a selected number of units of quantity (or amount in price) in which the contract will be executed. In another instance, the contract is limited by timing rules, such as the effective date (e.g., at both contract and line item level) of the contract, the expiration date (e.g., at both contract and line item level) of the contract, as well as the type of date that drives the effective and expiration dates (e.g., the order date, invoice date and/or receipt date).

If price business rules are input at block 474, then the buyer and seller can select pricing or pricing validation business rules at block 478. If the buyer and seller do not select pricing validation rules at block 478, then pricing rules are applied at block 480. When a buyer placing an order selects pricing rules, the CCM uses contracts and product price information to apply prices to each item on the order at block 480. When a seller selects pricing rules, the CCM uses contracts and product price information to apply prices to each item being sold as part of a particular contract.

If pricing validation rules are selected at block 478, then pricing validation business rules are applied at block 482. In this case, stored prices are used by the CCM to validate, for example, the price provided from a buyer's procurement system and/or a seller's fulfillment system (e.g., buyer procurement system 270 and seller fulfillment system 260 of FIG. 2) at block 482. The price that is provided by the procurement and/or fulfillment system is the price used in reconciling order and invoice prices, when validated. In this regard, the CCM uses contract and product price data to audit the order price against the contract or list prices at block 482. If price validation is selected by the buyer, the CCM will use contracts and product price information to audit the order price against contract or list prices. If price validation is selected by the seller, the CCM will use contracts and product price information to audit the invoice price against contract or list prices.

For instance, using price validation rules, the buyer and seller may establish tolerance values for unit prices at block 484. The buyer and/or seller may choose to express the tolerance values as a percentage of the fixed price or as a fixed amount at block 484. In one implementation, the tolerance values are expressed as a percentage of the unit price at block 488. In another implementation, the tolerance values are expressed as a fixed amount of the unit price at block 486.

The above approaches discussed in connection with FIG. 4B can be implemented in a variety of manners. For instance, in one example implementation using pricing business rules, the buyer and seller establish that pricing business rules will be applied for automated contract performance. If pricing business rules have not been applied, the CCM does not provide pricing for the transaction (e.g., as processed by the central processor 140 of FIG. 1). If business rules are selected, the buyer and seller can decide whether to use pricing or pricing validation business rules. If pricing rules are selected, then the prices automatically set by the CCM are the definitive prices used for contract performance.

In another instance, pricing validation rules are selected and prices from the CCM are used to validate prices provided by the seller's fulfillment system and/or the buyer's procurement system. The buyer and seller will also establish tolerance values expressed as a fixed amount or percentage of the unit price. For example, if the buyer and seller both have a three percent tolerance value for the unit price, pricing validation rules are used to determine whether the prices in a particular transaction meet these tolerances. For instance, if the unit price stored in the CCM is one percent less than the unit price stored in the seller's fulfillment system and one percent greater than the unit price stored in the buyer's procurement system, the difference in the unit price of the CCM is within the three percent tolerances. The price validation business rules will therefore effect automatic approval of the transaction because the three-percent tolerance has been met for both the buyer and seller. The transaction will proceed using the unit price from the CCM if buyer and seller have previously agreed to contract performance in this manner.

Alternatively, the buyer may have agreed to use the unit price stored in the CCM provided that the unit price in the buyer's procurement system is within the three percent tolerance of the unit price in the CCM. In another alternative, the seller may have agreed to use the unit price stored in the CCM provided that the unit price in the seller's fulfillment system is within the three-percent tolerance of the unit price in the CCM. These and other alternatives can be readily implemented in connection with the examples discussed above and with those shown in FIG. 4B.

FIGS. 5A-5D are block diagrams illustrating example user profile configuration approaches with relationships shown between buyers, sellers and organizations for use with a collaborative contracts manager (CCM), such as discussed above, according to other example embodiments of the present invention. A plurality of user profiles are supported, including seller (e.g., manufacturer or distributor), buyer, contract owner, and member profiles. A seller/buyer profile is arranged so that the seller/buyer for whom the profile is established acts as a financial participant in contracts established using this approach, and may submit contract data as participant and/or as a contract owner. A member relationship profile facilitates access to transactional data, but does not necessarily act to facilitate financial participation of the user for whom the profile is established. With these approaches, contract terms such as pricing and others can be managed using a CCM.

Figure 5A:
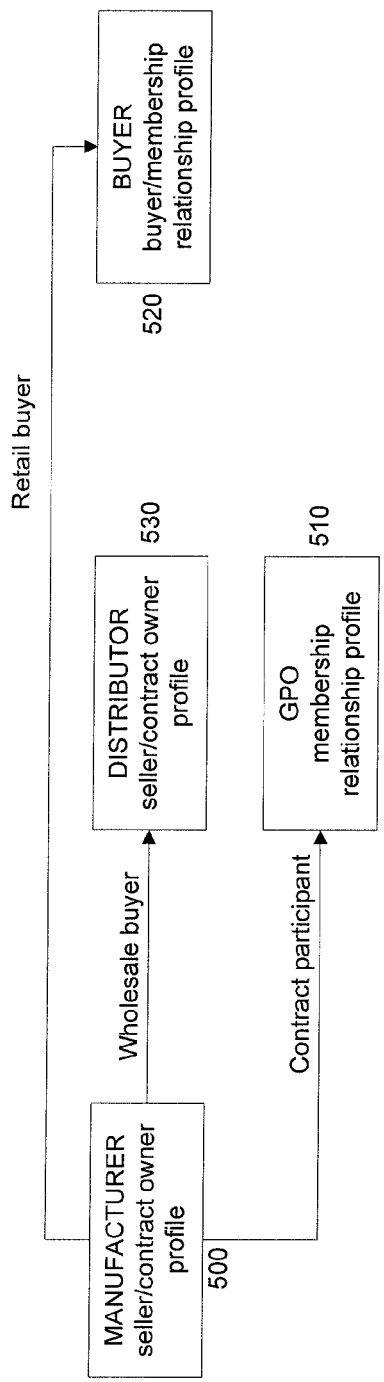

Referring now to FIG. 5A, block 500 represents a manufacturer operating as a seller and/or contract owner who submits a product list, contract cost, and eligible buyers to the CCM. The manufacturer at block 500 views a group purchasing organization (GPO) (block 510) as a contract participant, an individual buyer (block 520) as a retail buyer and a distributor (block 530) as a wholesale buyer. The contract approaches for each relationship with the manufacturer 500 are tailored for the particular relationship. For instance, if an individual buyer 520 accepts a contract, the CCM stores a sell price. If a contract submitted by the manufacturer 500 is accepted by a distributor 530, the CCM stores a contract cost that is then used for future transactions between the distributor and the manufacturer. Similarly, if a GPO 510 accepts a contract offered by the manufacturer 500, the CCM stores the contract for use by members of the GPO.

Figure 5B:
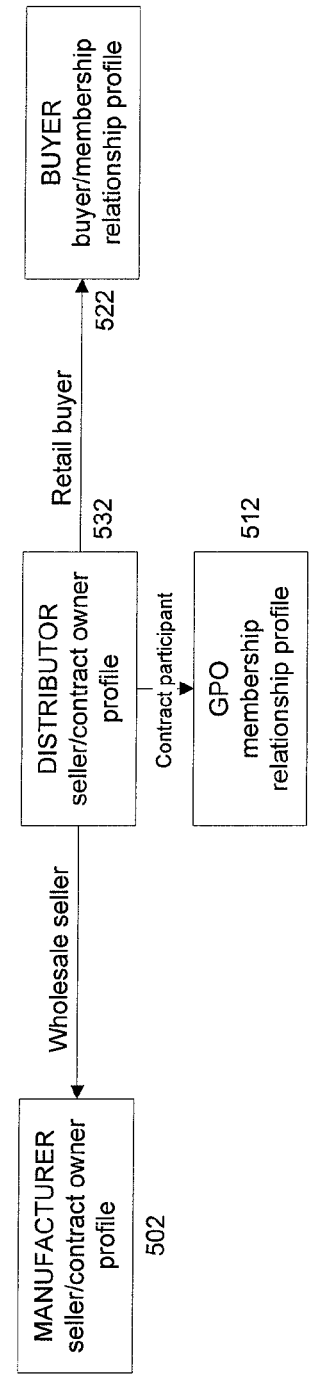

The example embodiment shown in FIG. 5B illustrates an example user profile configuration from a distributor perspective. A distributor at block 532 has profile information including seller and/or contract owner information that is stored at the CCM. The distributor 532 views relationships with a manufacturer at block 502 as a wholesale seller relationship, with a GPO at block 512 as a contract participant relationship and with an individual buyer at block 522 as a retail buyer relationship. Price relationships between the distributor 532 and the manufacturer 502, GPO 512 and buyer 522 are stored at the CCM.

Figure 5C:
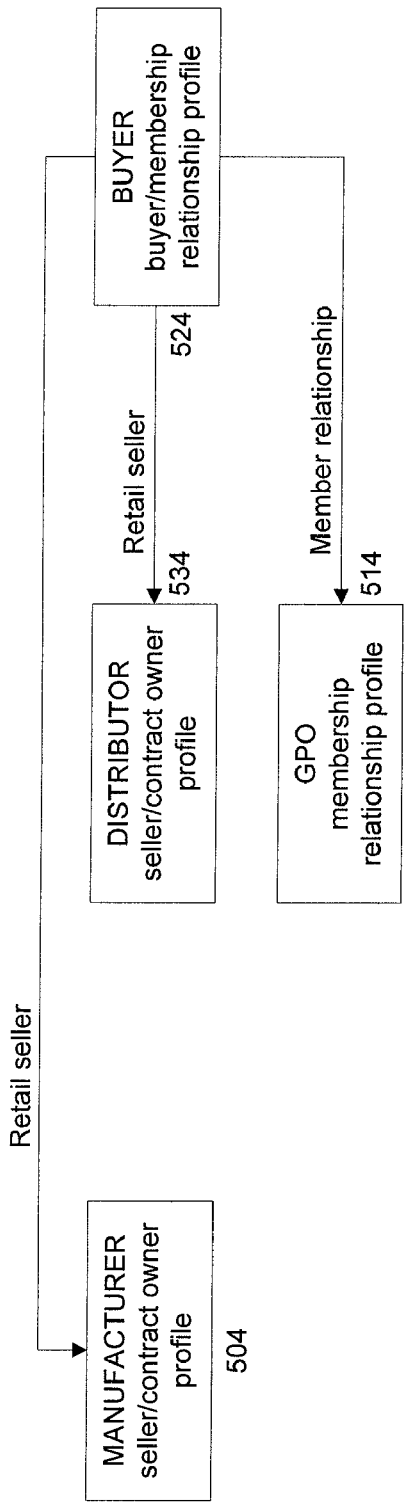

FIG. 5C illustrates an example user profile configuration from a buyer perspective at block 524. The buyer 524 has profile information including buyer and/or membership profile information that is stored at the CCM. The buyer 524 views relationships with both a manufacturer at block 504 and a distributor at block 534 as retail seller relationships (i.e., when the manufacturer sells directly to retail buyers). The relationship between the buyer 524 and a GPO at block 514 is a membership relationship, with the buyer being able to use contract terms assigned to the GPO and stored at the CCM.

Figure 5D:
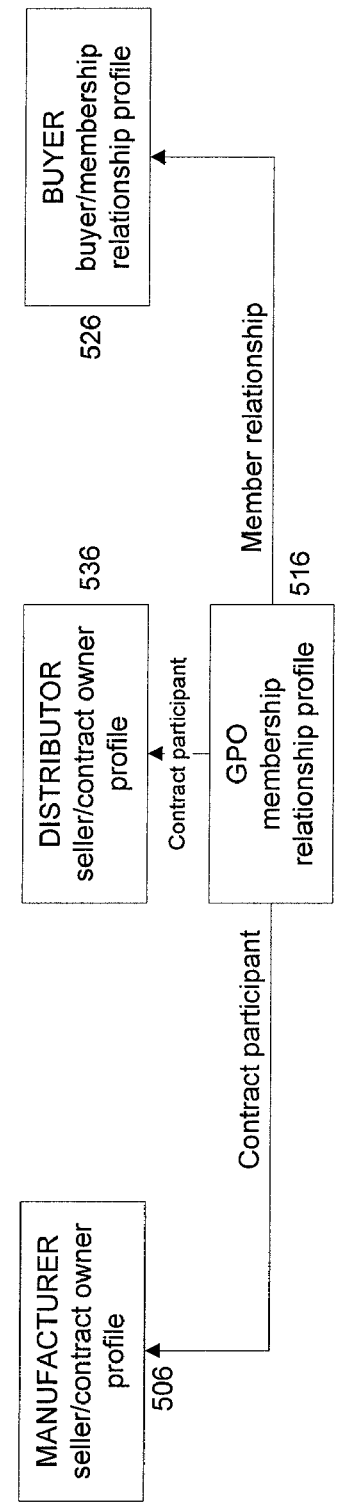

FIG. 5D illustrates an example user profile configuration from a GPO perspective at block 516. The GPO 516 views relationships with both a manufacturer at block 506 and a distributor at block 536 as a contract participant relationship, with the GPO participating in contracts stored at the CCM in connection therewith. The GPO 516 views a relationship with a buyer at block 526 as a member relationship, with information regarding the membership of the buyer stored at the CCM, and the buyer correspondingly able to participate in contracts for the GPO 516 also stored at the CCM.

While certain aspects of the present invention have been described with reference to several particular example embodiments, those skilled in the art will recognize that many changes may be made thereto without departing from the spirit and scope of the present invention, aspects of which are set forth in the following claims.

What is claimed is:

1. A system comprising:
   a data storage circuit including a cross-correlation database that stores data for subsequent retrieval by the data storage circuit and processing by an integrated, electronic supply chain processing computer engine, the data including
      respective sets of first data corresponding to disparate and separately-operating entity participants, and
      respective sets of second data corresponding to contract terms established by transaction participants for multiple active transactions involving the disparate and separately-operating entity participants, and
   a plurality of algorithms, each of the plurality of algorithms operating on
      first data, from the sets of the first data, corresponding to at least two of the disparate and separately-operating entity participants, and
      second data, from the sets of the second data, including
         previously-negotiated parameters corresponding to prospective transactions, each prospective transaction involving said at least two of the disparate and separately-operating entity participants, and
         variable parameters that impact prices for the multiple transactions; and
   a computer-based data processor, configured for performing the following steps for each prospective transaction,
      selecting one of the plurality of algorithms,
      from an applicable set of previously-negotiated parameters, selecting previously-negotiated parameters for execution by the selected one of the plurality of algorithms,
      retrieving current transaction data that corresponds to a parameter in the set of variable parameters on which the selected one of the plurality of algorithms operates,
      executing the selected one of the plurality of algorithms with the selected previously-negotiated parameters and with retrieved active transaction data to automatically derive a new term,
      assessing for validation said one of the prospective transactions for the current transaction with the new term at least partly defining a price for the current transaction and,
      in the event that said one of the prospective transactions is validated for the current transaction, generating payment data based on the price, and
      in the event that said one of the prospective transactions is not validated for the current transaction, generating exception data that identifies a reason that the prospective transaction is not to be validated.

2. The system of claim 1, wherein the computer-based data processor is a computer processor circuit configured for selecting one of the plurality of algorithms by selecting an algorithm that operates on first data including different sets of rule data respectively corresponding to disparate and separately-operating entity participants for the current transaction.

3. An automated pricing system for use by remotely-located buyers and sellers who provide respective sets of electronic business rules data for transaction data to be processed by the automated pricing system, the automated pricing system comprising:
   a correlation database that stores transaction party identification data, business rules data for each transaction party, contract data specifying contract terms defined by parties to each transaction to which the transaction data pertains, and correlation data for correlating transaction data sets with the identification data, business rules data and contract data, the contract terms including previously-negotiated parameters corresponding to prospective transactions between parties including at least one buyer and seller, and variable parameters that impact prices for the multiple transactions; and a computer and communications circuit, including a software-programmed computer configured to, for each received transaction data set and a transaction to which the data set applied, use the data stored in the correlation database to correlate the transaction data set with business rules data and contract data for parties to the transaction, select one of a plurality of algorithms that operate on the business rules data and the contract term-defined parameters stored in the correlation database for the correlated buyer and seller, execute the selected algorithm, using the previously-negotiated parameters and variable parameters for the buyer and seller as inputs, to derive an electronic price term that sets a price for the transaction, and audit the set price against at least one of: the business rules data for the buyer, the business rules data for the seller, and the contract terms to validate the set price.

4. The system of claim 3, wherein the computer and communications circuit is configured to validate correlated contract data against correlated business rules for at least one of the parties to a particular transaction to determine that the contract data is valid, and execute the selected algorithm to derive an electronic price term by executing the algorithm in response to the contract data being validated.

5. The system of claim 3, wherein the computer and communications circuit is configured to validate correlated contract data against correlated business rules defining an effective data and an expiration data for the contract data, and execute the selected algorithm to derive an electronic price term by executing the algorithm in response to the contract data being validated.

6. The system of claim 3, further including an interface circuit configured and arranged to receive proposed product-pricing data from a seller, provide the product-pricing data to at least one potential buyer, and upon acceptance by a potential buyer, store the accepted product-pricing data as part of the contract data in the correlation database for use in deriving an electronic price term for a transaction involving the buyer and seller.

7. The system of claim 3, wherein the computer and communications circuit is programmed to control remote secure access to the correlation database for electronically transmitting business rules data from remote data entry terminals over a public communications network.

8. The system of claim 3, wherein the computer and communications circuit is configured to match transaction-party product identifiers in the transaction data sets with product identifiers for different transaction parties, use the matched product identifiers to identify contract terms applicable to the identifiers, and execute the selected algorithm to derive the electronic price term by executing the algorithm with the identified contract terms applicable to the identifiers.

9. The system of claim 3, wherein the computer and communications circuit includes a pricing engine configured to identify different sellers that respectively provide seller offerings defined in the transaction data set, and to select one of the sellers to provide the seller offerings based upon stored contract data for the selected seller identifying a lower relative price for the seller offerings, and correlates the transaction data set with business rules for the selected seller.

10. The system of claim 3, wherein the correlation database stores business rules data that include compliance data that must be met before making the transaction payable, and the computer and communications circuit is configured to audit the set price against the compliance information to validate the set price.

11. The system of claim 3, wherein the computer and communications circuit includes a collaborative contracts computer processor that is configured to automatically set variable pricing parameters by which pricings of purchases of seller offerings in the transaction data sets are made, using correlated contract data including transaction pricing information from at least one of the buyer and the seller.

12. The system of claim 3, wherein the computer and communications circuit is configured to correlate the transaction data set with a buyer organization in which a buyer in the transaction participates, and includes a collaborative contracts computer processor that is configured to automatically set variable pricing parameters by which pricings of purchases of seller offerings in the transaction data sets are made, using correlated nested contract data including base sell price data for a manufacturer's contract with the buying organization, and a buyer's contract with the buying organization for said item.

13. The system of claim 3, wherein the computer and communications circuit is configured to correlate the transaction data set with a buyer organization in which a buyer in the transaction participates, and execute the selected algorithm using markup variables specifying a markup to add to a base sell price for the items specified via the transaction data.

14. The transaction system of claim 3, wherein the computer and communications circuit is configured to cross-reference product identifiers in the transaction data with different product identifiers for a party to the transaction, and to use the cross-referenced product identifiers to correlate the transaction data set with business rules data and contract data.

15. The system of claim 3, wherein the computer and communications circuit is configured to use the correlated rules data to automatically negotiate payment terms of seller offerings identified in the transaction data set in response to a buyer-input request for a change in payment terms.

16. The system of claim 3, wherein the computer and communications circuit is configured to correlate the transaction data set with contract data by searching the correlation database to identify a contract meeting search criteria for at least one of the buyer and seller for the transaction.

17. A computer-based data processing method comprising:

storing sets of data in a cross-correlation database for subsequent processing by an integrated, electronic supply chain processing computer engine, including storing respective sets of business rules of disparate and separately-operating entity participants for implementing transactions therebetween, respective sets of contract data corresponding to contract terms useful for executing multiple transactions involving the disparate and separately-operating entity participants, each set of contract data including previously-negotiated parameters corresponding to prospective transactions, and correlation data for correlating sets of transaction data with a set of contract data and a set of business rules for a participant, in an integrated, electronic supply chain processing engine, using a software-programmed computer to, for each active transaction involving at least two of the disparate and separately-operating entity participants and pertaining to one of the sets of contract data, control and access the cross-correlation database to retrieve a set of the business rules for at least one of the participants using the correlation data to correlate the contract data to the business rules, execute a selection algorithm with the correlation data to select, from the cross-correlation database, previously-negotiated parameters and a price-impacting variable parameter for the active transaction based upon the contract data, and to control and access the cross-correlation database to retrieve the selected parameters, based upon the retrieved set of business rules, select and execute one of a plurality of algorithms to derive a new price term, using the selected previously-negotiated parameters and price-impacting variable parameter as variable inputs to the algorithm, and to set a price for the active transaction based upon the derived price term, and generate an electronic payment instruction for an electronic payment network identified by the business rules, based upon the derived price term, and communicate the electronic payment instruction to the identified electronic payment network.

18. The method of claim 17, wherein using the software-programmed computer to select and execute one of a plurality of algorithms includes using the software-programmed computer to select an algorithm that operates, at a single computer processor, on data including different sets of rule data respectively corresponding to disparate and separately-operating entity participants for the active transaction.

19. The method of claim 17, further including using the software-programmed computer to select an auditing algorithm based upon at least one party to the transaction and to execute the auditing algorithm to audit the set price against business rules for one of the participants.

* * * * *